United States Patent
Juzkow et al.

(10) Patent No.: US 10,950,899 B2
(45) Date of Patent: Mar. 16, 2021

(54) ABUSE TOLERANCE IN BATTERY MODULES

(71) Applicant: NIO USA, Inc., San Jose, CA (US)

(72) Inventors: Marc W. Juzkow, Livermore, CA (US); Alexander J. Smith, Mountain View, CA (US)

(73) Assignee: NIO USA, Inc., San Jose, CA (US)

( * ) Notice: Subject to any disclaimer, the term of this patent is extended or adjusted under 35 U.S.C. 154(b) by 230 days.

(21) Appl. No.: 15/994,570

(22) Filed: May 31, 2018

(65) Prior Publication Data

US 2019/0372173 A1    Dec. 5, 2019

(51) Int. Cl.
| | | |
|---|---|---|
| *H01M 10/48* | (2006.01) | |
| *H01M 10/42* | (2006.01) | |
| *H01M 10/65* | (2014.01) | |
| *H01M 2/10* | (2006.01) | |
| *B60L 53/80* | (2019.01) | |
| *B60L 50/60* | (2019.01) | |

(52) U.S. Cl.
CPC ........... *H01M 10/425* (2013.01); *B60L 50/66* (2019.02); *B60L 53/80* (2019.02); *H01M 2/1077* (2013.01); *H01M 10/65* (2015.04); *H01M 2010/4271* (2013.01); *H01M 2220/20* (2013.01)

(58) Field of Classification Search
None
See application file for complete search history.

(56) References Cited

U.S. PATENT DOCUMENTS

| | | |
|---|---|---|
| 5,965,290 A | 10/1999 | Shimizu et al. |
| 8,241,772 B2 | 8/2012 | Hermann et al. |
| 9,252,400 B2 | 2/2016 | LePort et al. |
| 9,444,087 B1 | 9/2016 | Jeon |
| 2009/0113697 A1 | 5/2009 | Yamamoto et al. |
| 2009/0162749 A1 | 6/2009 | Lee |
| 2010/0136387 A1 | 6/2010 | Kohn et al. |
| 2010/0136391 A1 | 6/2010 | Prilutsky et al. |
| 2010/0136424 A1 | 6/2010 | Hermann et al. |
| 2010/0247996 A1* | 9/2010 | Ijaz .................. H01M 10/0468 429/120 |
| 2012/0107663 A1 | 5/2012 | Burgers et al. |
| 2015/0380697 A1* | 12/2015 | Osborne ............. H01M 10/486 429/91 |
| 2016/0197322 A1 | 7/2016 | Tyler et al. |
| 2016/0336547 A1 | 11/2016 | Dawson et al. |
| 2016/0351902 A1 | 12/2016 | Hamanaka |

(Continued)

OTHER PUBLICATIONS

U.S. Appl. No. 16/168,497, filed Oct. 23, 2018, Juzkow et al.

(Continued)

*Primary Examiner* — Wyatt P McConnell
(74) *Attorney, Agent, or Firm* — Sheridan Ross P.C.

(57) ABSTRACT

An energy storage device and structure for energy storage cells is provided that includes a plurality of energy storage cells, each of the energy storage cells having side surface areas. The plurality of energy storage cells are arranged in a pattern with each energy storage cell being spaced a specified distance apart from one another. An expandable material is adhered, by an adhesive backing, to at least a portion of the side surface areas of one or more of the energy storage cells, and the expandable material expands within and at least part of the specified distance.

7 Claims, 8 Drawing Sheets

(56) References Cited

U.S. PATENT DOCUMENTS

| | | |
|---|---|---|
| 2017/0098806 A1 | 4/2017 | Bowersock et al. |
| 2017/0125862 A1 | 5/2017 | DeKeuster et al. |
| 2018/0069281 A1 | 3/2018 | Tutzer et al. |
| 2018/0108955 A1 | 4/2018 | Fees et al. |
| 2019/0081284 A1 | 3/2019 | Azuma et al. |
| 2019/0097228 A1 | 3/2019 | Kobayashi |
| 2019/0229384 A1 | 7/2019 | Tasiopoulos et al. |

OTHER PUBLICATIONS

"2535 Self Adhesive High Expansion Sealer," Product Data Sheet, Nitto Denko Corporation, 2013, 1 page.

"5880 & 5880C Self-Adhesive Expandable Weldable Sealers," Product Data Sheet, Nitto Denko Corporation, 2013, 1 page.

"Willseal® 600," Willseal LLC, Product Data Sheet, 2015, 13 pages.

Mikolajczak et al., "Lithium-Ion Batteries Hazard and Use Assessment," The Fire Protection Research Foundation, Jul. 2011, 126 pages.

Roth, "Abuse Response of 18650 Li-Ion Cells with Different Cathodes Using EC:EMC/LiPF6 and EC:PC:DMC/LiPF6 Electrolytes," The Electrochemical Society, ECS Transactions, 2008, vol. 11(19), pp. 19-41.

Wilson, "CC Expanding Sealer—An Alternative to 1- and 2-Part Expanding Foams," 3-C Production AB, 2010, 4 pages.

Notice of Allowance for U.S. Appl. No. 16/168,497, dated Apr. 22, 2020, 10 pages.

Official Action for U.S. Appl. No. 16/168,497, dated Jan. 16, 2020, 14 pages.

\* cited by examiner

ABUSE TOLERANCE IN BATTERY MODULES

FIELD

The present disclosure is generally directed to energy storage devices, in particular, toward batteries and battery modules for electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of on-board energy storage devices. These vehicle energy storage devices are generally arranged in the form of electrically interconnected individual battery modules containing a number of individual battery cells. The battery modules are generally connected to an electrical control system to provide a desired available voltage, ampere-hour, and/or other electrical characteristics to a vehicle. In some cases, one or more of the battery modules in a vehicle can be connected to a battery management system that is configured to monitor the voltage sensed from each cell in the battery module and/or the entire battery.

Electric vehicles are dependent on the integrity and reliability of the on-board electrical energy power supply and energy storage devices. Typical vehicle energy storage devices include a battery that is composed of a number of battery modules and each of these battery modules may include tens, if not hundreds, of battery cells. As can be appreciated, the chance of failure in a system is proportionate to the number of components, interconnections, and connection modes, etc., in the energy storage devices of a vehicle.

DETAILED DESCRIPTION

Figure 1:
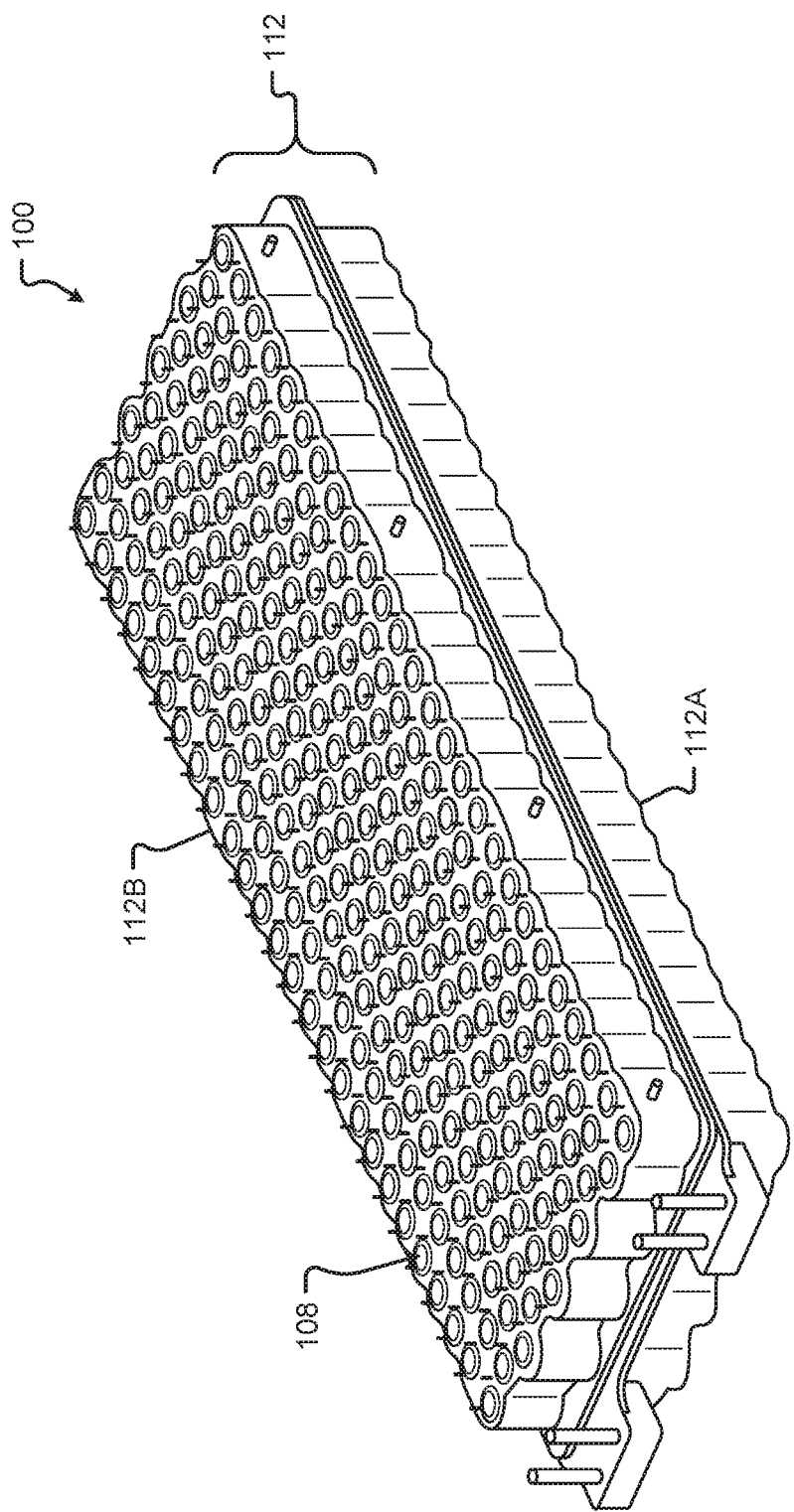
FIG. 1 shows a perspective view of a battery module in accordance with embodiments of the present disclosure.

Embodiments of the present disclosure will be described in connection with electrical energy storage devices, and in some embodiments the construction, structure, and arrangement of components making up a battery module for an electric vehicle drive system.

Although embodiments described herein may be described with respect to an electric vehicle, the present disclosure is not so limited. Various embodiments of the present disclosure can apply to any type of machine using a battery, for example mobile machines including, but not limited to, vertical takeoff and landing vehicles, aircraft, spacecraft, and watercraft, among others.

An electrical energy storage device for a vehicle may include one or more battery packs, each including a number of battery modules electrically interconnected with one another, to provide electromotive force for the electrical drive system of a vehicle to operate. Each battery module can include any number of battery cells contained and/or arranged within a battery module housing. Conventional battery module housings may include a base and a cover, which are attached at a periphery of the battery module via one or more fasteners. Because these conventional housings are designed to maximize the number of battery cells contained therein, all of the fasteners and attachments are moved to an outer periphery of the housing, and the cover and base are generally made from thick plastic or metal to provide structural rigidity and integrity. As can be appreciated, these conventional housings (e.g., covers, bases, etc.) can be large, heavy, and costly. Furthermore, most battery modules include external safety structures to provide impact resistance. Such safety structures can be made of various types of materials, including foam.

If the structure surrounding the cells is a foam, there can be additional problems related to the materials used as well as the injection process (if the foam is an injectable foam). These problems can raise the cost, timeframe, and complexity of creating the structure. For example, multiple personnel may need to be involved in the processing steps (increasing costs). Also, the manufacturing process may be time-consuming (including the necessity of mixing the liquid and requiring multiple steps, various equipment (syringes, mixers, cleaning materials, etc.) and the use of batches for the mixing and injection), error-prone (e.g., due to the multiple steps and personnel required, and also the liquid may solidify before being uniformly distributed), and dirty (due to spilling and the amounts of equipment required). The use of various types of injectable foam can also undesirably require the utilization of personal protective equipment (PPE). In addition, in some injection processes, the injection of a solution can only be done through holes in the sides of the battery module, so that it is difficult to achieve a uniform foam distribution between all cells within the module due to the distance the foam has to travel, the narrow channels, and the speed at which the foam solidifies. In various aspects, it may be desirable to have a uniform filling of the foam within the module so that there are minimal or no gaps that can cause thermal and electrical issues due to a lack of thermal and/or electrical insulation.

In addition to the above concerns, the battery is also typically one of the largest, heaviest, and most expensive single components of an electric vehicle. As can be appreciated, any reduction in size and/or weight can have significant cost savings. The present disclosure describes a battery module including a battery cell structural support system using expandable tape. In some embodiments, the present disclosure describes a method of forming a lightweight battery module including attaching separate battery module carrier portions together (e.g., via an adhesive flange joint) and allowing the tape to expand, or activating the tape to expand.

In one embodiment, the battery module may include one or more carrier portions (e.g., a lower carrier portion and an upper carrier portion) configured to surround one or more battery cells packed in a specific arrangement. If multiple carrier portions are used, they may be temporarily joined together at a contacting flange and then permanently interconnected to one another after the battery cells arranged with the expandable tape are packed within the carrier portions.

Among other things, the battery module provides impact resistance by dissipating an impact across a structure (e.g., made up of an expanded material such as tape) encompassing, or at least partially surrounding, the battery cells inside the battery module. The structure may be configured to flexibly move in response to an applied force or impact. Thus, filling in the gaps or portions of the gaps between cells in the module with a solid material may provide an improved level of abuse tolerance to impacts on the structure, including vehicular impacts.

In various embodiments, the expanded tape may act as a structural adhesive, thermal insulator, and even a dielectric barrier within the module. In various embodiments, filling in the gaps or portions of the gaps between cells in the module with a solid material may provide improved thermal and electrical properties.

The carrier portion(s) of the battery module may be configured as thin dielectric (e.g., plastic, composite, or other electrically nonconductive or insulative material, etc.) components that house the battery cells and the expandable tape. When joined together and the compressed tape is expanded, the carrier portions together with the expanded tape can provide a lightweight battery module configured to absorb shock, impact, compression, and/or any other destructive force. In some embodiments, the base of the module may be bonded to a cooling, or cold, plate using a structural adhesive that provides a thermal conductor (e.g., thermal interface material), and a di-electric barrier between the elements.

Among other things, the present disclosure describes manufacturing methods, construction, and an arrangement of components that are configured together (e.g., connected) to form a battery module. At least one benefit of the embodiments described herein is observed in the event of a crash scenario. For example, by mechanically coupling the cells together (e.g., via the expanded tape), the load, force, or impact energy from a crash is distributed across a larger body rather than focused on a single battery cell or any small group of battery cells. As can be appreciated, this distribution of forces provides a safer battery module assembly and a safer battery pack for a vehicle because the structure makes it less likely that a single cell will be damaged to the extent that it would cause a thermal event or a non-passive failure in the energy storage device of the vehicle.

In some embodiments, during the assembly of a battery module, for instance, compressed tape may be adhered to some or all of the cells to be arranged within the battery module to provide improved rigidity, strength, insulation, and/or exact tolerance "no slop" fits between the cells. At least one advantage to using tape is that the tape is simpler and faster to use (e.g., there may be less manufacturing or assembling steps and/or less equipment required, and the automation of various steps may also be possible) than other processes of structurally supporting the cells. Other advantages include that the use of expandable tape may be safer than other methods (e.g., there is no required use of PPE and no spill hazards). In addition, it is possible to choose tape that is self-expanding (e.g., no separate step (or activator) is required for the tape to expand) or to choose tape that takes advantage of other methods of activating the expansion of the tape.

Among other things, the present disclosure provides a control structure configured to contain cells with expandable tape in a particular volume of the battery module and protect portions of the battery cells and/or module from any non-uniformities of the structural volume that may damage the cells and/or module. In some embodiments, the structure may provide more complete filling within the inter-cell spaces within a module. In other embodiments, the structure may provide more uniformity while maintaining gaps/voids within the inter-cell spaces within a module.

In some embodiments, the present disclosure provides a form having an array of die-cut apertures to accommodate the battery cells in the battery module. Each of the die-cut apertures may be configured to fit tightly around one or more battery cells and/or battery cells having tape attached (e.g., the apertures may be undersized or have a smaller diameter than a diameter of the battery cell after the expandable tape has expanded). This tight fit may prevent undesirable gaps and spaces within volume between the cells. In one embodiment, as the tape expands, the form may be moved along an axis of the battery module a known amount.

The form may additionally contact one or more sides of the housing in an interference, tight, press, or slip fit, that may provide a structural element to the module. In addition, the form may provide a gasket that prevents the tape from expanding outside of the connectors or other portions of the module. In some embodiments, the form may be made from a relatively lightweight and/or thin amount of material (e.g., closed-cell foam, plastic, silicone, etc.).

In various embodiments, the form may be used to hold the battery cells in alignment with one another prior to expanding the tape. After the tape has fully expanded, the form may remain in place or be removed. The form may be a part of the module or the carrier(s), or it may be a separate piece.

The expandable tape used in embodiments as described herein may be applied to some or all cells within a module in any manner. For example, the tape may be applied to portions or all of the side surfaces of cells. The tape may be applied to a cell in various patterns or shapes. The tape may be applied so that it occupies an entirety of volumes between the cells after expansion, or so that it occupies only a certain portion of the volumes between the cells after expansion. The tape may be applied to certain portions of a first cell but to different non-overlapping portions of an adjacent cell. The tape may be applied to a first cell but not to an adjacent cell. Other schemes for applying the expandable tape will be appreciated by one of ordinary skill in the art.

In addition, the expandable tape may be applied so that other properties of the module are taken into consideration. For example, to reduce a weight of the module, to improve thermal properties between cells and/or of the module, and/or to improve electrical insulation between cells and/or within the module.

The tape may be self-expanding (e.g., the tape does not require any particular type activation, other than the step of placing the tape in the desired positions and waiting a certain amount of time), or the tape may require an activation step (such as by application of heat, light or other wavelength of radiation, application of a vacuum, or use of a mechanical method such as pulling a thread to release the outer film wrap that was holding the foam in its compressed form) in order to expand. Activation of the expansion of the tape may be done prior to or after placement of some or all of the cells within the form and/or the module.

The present disclosure may provide for a more rigid structure of the module or a more rigid structure surrounding the cells, may allow for lighter materials (e.g., thinner cross-sections, composites, polymers, etc.) to be used in the modules, and may allow a more densely-packed battery comprising a number of battery modules in intimate or near-intimate contact with one another as well as a number of cells in intimate or near-intimate contact with one another.

There are multiple advantages of the embodiments described herein. For example, wrapping the cells in expandable tape is a process that can be automated so that processing steps have greater consistency, are faster, and are less expensive, for example by reducing or eliminating the need for multiple personnel. Using expandable tape can decrease or avoid the use of solvents, liquid solutions, or washing processes (e.g., washing large syringes between each injection of foam components), and can be a cleaner process overall. Also, the use of foam tape can avoid fumes and other hazards so that there is no requirement to use PPE. Advantages can also include, but are not limited to: improvements in gravimetric energy density of the module, improved abilities to choose and obtain materials (e.g., selecting a certain volume or density of inter-cell filling material while maintaining a reduced module weight), and improved abilities to store materials, among others.

FIG. 1 shows a perspective view of a battery cell structural support 100 of a battery module. The battery cell structural support 100 includes a joined housing and cells forming the battery module in accordance with embodiments of the present disclosure. The battery cell structural support 100 may at least comprise a housing 112 comprising a lower housing 112A, the battery cells 108, an upper housing, or cover, 112B, and other structural components (not shown; described below) disposed above and/or between adjacent battery cells 108 as well as between the battery cells 108 and the lower housing 112A and/or cover 112B. As shown in FIG. 1, the lower housing 112A and/or the cover 112B may be configured to at least partially contain the battery cells 108. For instance, the lower housing 112A and the cover 112B may include a number of surfaces and walls defining battery cell 108 containment cavities including volumes for receiving the battery cells 108. Both the lower housing 112A and cover 112B may include a number of receptacles sized to receive and arrange each of the battery cells 108 relative to one another. In one embodiment, the lower housing 112A and cover 112B may include receptacles, or apertures, configured to receive one or more fasteners and mount sleeves (not shown). Thermally conductive, electrically insulating materials may be disposed within the housing 112 and between the cells 108, as described herein.

In the present disclosure, the cells may be described in the terms of having "upper" and "lower" portions, where the upper portion is above the lower portion on the cell when the cell is positioned in the housing 112. The upper portion may be adjacent to a top side (e.g., a top surface) or positive terminal end of the cells 108. The bottom portion may be adjacent to a bottom side (e.g., bottom surface) of the cells 108, which is opposite the top side of the cells 108. Thus, the top side of the cells 108 is closer to the cover 112B, and the bottom side of the cells 108 is closer to the lower housing 112A. The distance between the top and bottom of a cell may be referred to herein as the length or height of the cell.

The tape can be any expandable material and may include an expandable material with an adhesive backing on at least a portion of the expandable material. The adhesive backing may be permanently adhered to the expandable material. The tape may include an expandable material having an adhesive permanently adhered to the expandable material. The adhesive and/or adhesive backing may have a covering that, when removed, exposes the adhesive (e.g., the sticky portion(s) of the tape).

Further, the tape may have the dimensions of length, width, and height. As described herein, an area of adhesiveness may be described as the width and length, with a thickness of the layers (e.g., the foam, adhesive and/or adhesive backing) being described as the width. Thus, the height of the tape as described herein is perpendicular to the height of the cell.

Figure 2:
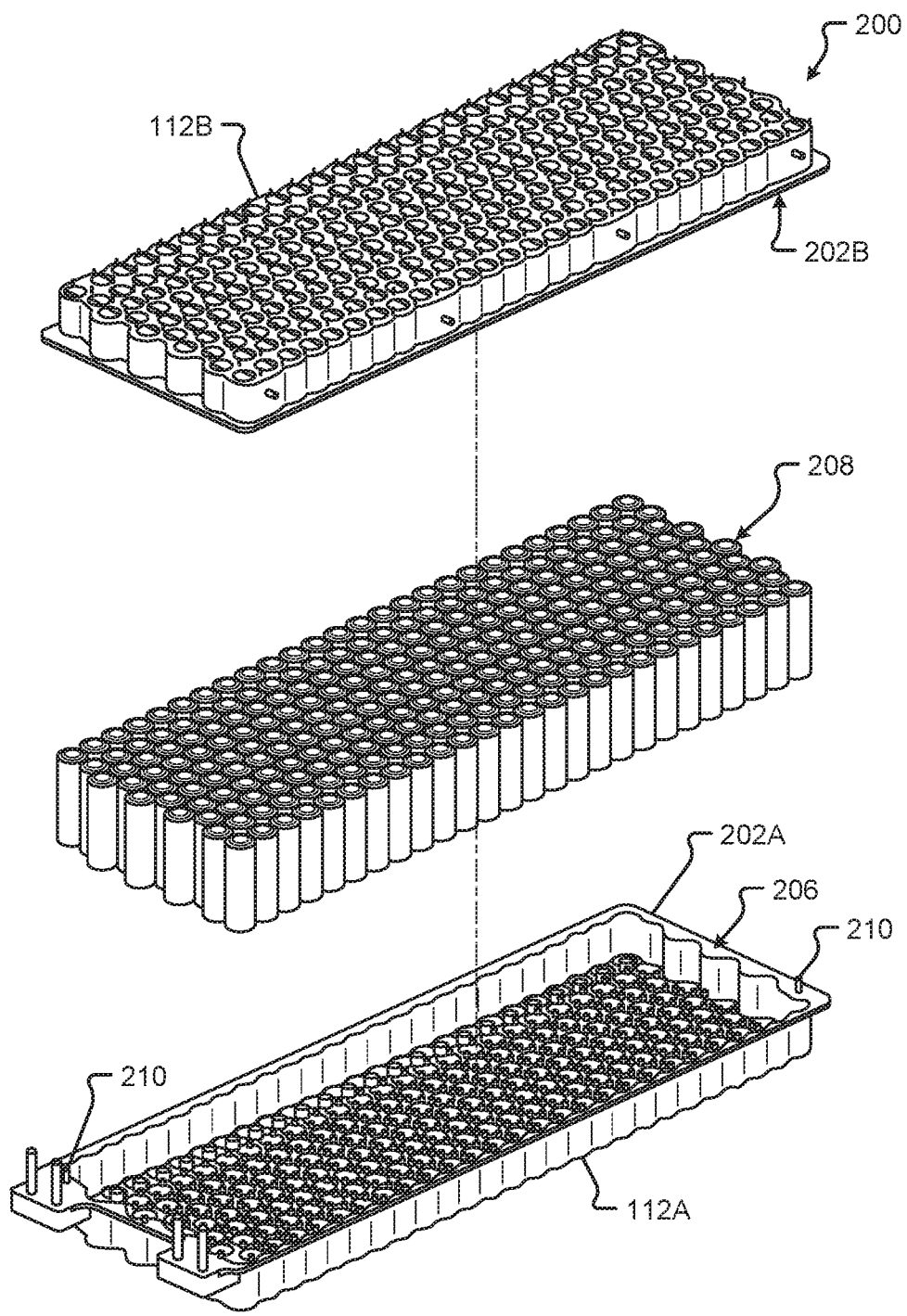
FIG. 2 shows a perspective view of the joined housing and cells forming the battery cell structural support for the battery module in accordance with embodiments of the present disclosure.

FIG. 2 shows a perspective exploded view 200 of the structural support 100 of the battery module in accordance with embodiments of the present disclosure. As discussed with respect to FIG. 1, the structural support 100 can include a plurality of battery cells 208 and a housing comprising a lower housing 112A and a cover 112B configured to contain the battery cells 208.

The lower housing 112A and the cover 112B may have a number of surfaces and walls defining containment cavities for the battery cells 208 including volumes for receiving the battery cells 208. Both the lower housing 112A and cover 112B may include a number of receptacles sized to receive and arrange each of the battery cells 208 relative to one another. The cells 208 may be held in place using, for example, inserts at a top side and a bottom side of each cell. In one embodiment, the lower housing 112A and cover 112B may include receptacles, or apertures, configured to receive one or more fasteners and mount sleeves (not shown).

Systems and methods of containing cells 208 within a module are not limited to those described herein. Illustrative methods can include inserting cells 208 into a form (e.g., a retaining form) that holds the cells in place, where the cells 208 have an expandable tape (not shown in FIG. 2) attached to at least a portion of at least some of the cells 208. In various embodiments, the retaining form may be used together with the housing 112, the lower housing 112A, and the cover 112B. The retaining form may be any size or configuration to retain the cells 208. The retaining form may be placed into the housing 112 before or after placing the cells 208 into the form or portions of the housing 112. The housing 112 may have a clamshell configuration, where it opens and closes (e.g., hinges) along one side, or the housing 112 may be configured to be in a single piece and may have receptacles to receive the cells after the housing 112 has been manufactured as a single piece. The housing 112 may have a lower housing 112A and a cover 112B that are not connected until the cells 208 are placed within one of the lower housing 112A and the cover 112B. The housing 112 or either or both of the lower housing 112A and the cover 112B may have any shape and configuration to contain the cells 208, such as an egg carton shape. In embodiments described herein, a structure surrounding the cells 208 (e.g., in contact with portions of sides of at least some of the cells 208) includes an expandable material, which may be an expandable tape, illustrative embodiments of which are shown and described further in FIGS. 3A-6C.

One or more of the retaining form, the lower housing 112A, and the cover 112B may include a number of receptacles (e.g., cell-receiving features) sized to receive and arrange each of the battery cells 208 relative to one another. Various sizes and configurations of the receptacles may be used in embodiments described herein and the present disclosure is not limiting. For example, the cells 208 (with one or more having tape adhered thereto) may be slid into the receptacles in a housing 112. The cells may be slid into one or more portions of the housing 112 in any direction, e.g., from a top direction or from a bottom direction. The receptacles may be located in only a portion of the housing 112, or they may be configured as through-holes, extending through an entirety of the housing 112 (including any lower housing 112A and cover 112B).

The retaining form and housing may be made from various materials. In some aspects, one or more of the retaining form, the lower housing 112A, and the cover 112B may be made from a foam, plastic, or other lightweight dielectric material (e.g., low-density rigid foam, closed-cell foam, open-cell foam, molded plastic, composites, etc.). One or more of the retaining form, the lower housing 112A, and the cover 112B may have receptacles that may be die cut, wire electrical discharge machined (EDM) cut, machined, molded, or otherwise formed through the one or more of a retaining form, the lower housing 112A, and cover 112B. It is an aspect of the present disclosure that the number of receptacles in the battery cell retaining form match the number of battery cells 208 in the battery module 108. The receptacles may have any size and/or shape. For example, some or all of the receptacles may have a size that conforms to a size of the radius of at least one of the cells 208, or some or all of the receptacles may have a size that conforms to a size of cells 208 together with a compressed tape, or some or all of the receptacles may have a size that conforms to a size of cells 208 together with an expanded tape. In some aspects, the cells 208 may be adhered to a cold plate at their bottom surfaces after they have been placed within the housing 112 or a retaining form, or otherwise positioned in an acceptable configuration.

In some embodiments, the lower housing 112A and the cover 112B may be attached together, at least temporarily, via flanged surfaces 202A, 202B. In one embodiment, the flanged surface 202A and/or the mating flanged surface 202B may include at least one connecting element 210 (e.g., fastener, standoff, post, tab-and-slot, clip, or other connective interface, etc.) that is configured to mate, or interconnect, with a corresponding feature on the other of the flanged surface 202A and/or the mating flanged surface 202B. The flanged surface 202A may follow at least a portion of the periphery of the lower housing 112A. The flanged surface 202A may be offset from and substantially parallel to a base, or planar surface, of the lower housing 112A. In one embodiment, the flanged surface 202A may extend outwardly from the walls of the lower housing 112A. The cover 112B may include a similar mating flange, or mating flanged surface 202B that follows at least a portion of the periphery of the cover 112B and/or the lower housing 112A. The mating flanged surface 202B of the cover 112B may be offset from and substantially parallel to a planar surface of the cover 112B. In one embodiment, the mating flanged surface 202B may extend outwardly from the walls of the cover 112B.

The flanged surface 202A and/or the mating flanged surface 202B may include an adhesive layer 206 deposited thereon. The adhesive layer 206 may attach the lower housing 112A to the cover 112B, and more specifically, connect the flanged surface 202A to the mating flanged surface 202B. In one embodiment, the flanged surface 202A and/or the mating flanged surface 202B may include at least one connecting element (not shown) that is configured to mate, or interconnect, with a corresponding feature on the other of the flanged surface 202A and/or the mating flanged surface 202B.

In various embodiments, the battery modules may include other elements not shown in the figures herein, such as battery cell interconnects, first and second battery module busbars, a cooling plate, and one or more mount sleeves. For example, a surface of each battery cell 208 (e.g., the bottom surface) may be placed into contact with a cooling plate that may be configured to convey a coolant or other fluid therethrough, thereby cooling at least one surface of the cooling plate and objects (e.g., battery cells 208, etc.) in contact with the at least one surface. In one embodiment, the battery cells 208 may be mechanically adhered to the cooling plate via a thermally conductive adhesive material. Tape may be placed on at least portions of some or all of the cells 208 prior to adhering the cells 208 to the cooling plate. The battery modules may then be electrically interconnected via at least one battery busbar including high voltage positive and negative terminals connected to an electrical system (e.g., an electrical system of a vehicle). The battery may be configured as any number of battery modules that are capable of being electrically connected together.

FIGS. 3A-6C show cross-sectional views of battery cell structures in accordance with embodiments of the present disclosure. For example, FIGS. 3A-6C show illustrative configurations of the tape on cells. In each of FIGS. 3A-6C, although the tape may be shown as being adhered in a same pattern on every cell, the tape does not have to be in a same pattern on every cell, and the tape does not have to be adhered to every cell. For example, the tape may be only adhered to every other cell within a module. Although various configurations of the tape on the cells are shown herein, configurations of the tape on the cells are not limited by this disclosure.

In various embodiments, one side of the tape may have an adhesive layer, with the opposite side having an expanding layer. The adhesive layer may be used for application to (e.g., placement on) the cells, and the adhesive layer may adhere in any manner. For example, the adhesive layer may be sticky when it is exposed when the tape is unrolled from a reel, or it may be sticky when a covering material is removed. The adhesive layer may be referred to herein as a "self-adhesive" layer or side. The tape's self-adhesive side may advantageously allow for easy and fast application to the cells.

Following the application of the tape on the cells, the cells may be inserted into a module and fixed in the module frame (or otherwise fixed in place), adhered to a cold plate, and then welded to bus bars. In some steps, the compressed tape may be activated. In other embodiments, the tape may be self-activated or activated over time. Thus, the tape may slowly start to expand upon application to the cells (e.g., upon removal of the tape from a reel, where a configuration of the reel kept the tape in its compressed form), with the expansion taking a certain time, e.g., several hours. Thus, the tape may be self-expanding over a period of time. The expansion may start before or after the tape is adhered to the cells.

The tape may require various types of activation, and the activation of the tape is not limited by the description herein. Activation can be accomplished using heat, UV, vacuum and/or a mechanical method (for example, pulling a thread to release an outer film wrap that was holding the foam in its compressed form).

The dimensions of the tape may vary, and it may be available in different dimensions prior to application on the cells. For example, the tape may be available on a reel so that the length is customizable. As described herein, the length of the tape may be a longer dimension of the tape, e.g., the wound length if the tape is wound on a reel, and the width (as used herein) is the width of the reel. Also, the thickness of the tape (e.g., the thickness of the materials of the tape such as the adhesive and expandable material) may be referred to herein as the height of the tape. Thus, the height of the tape, as described herein, is perpendicular to the height of the cells. Any or all of the dimensions of the tape may be customizable, for example by cutting the tape material(s) before or after application to the cells.

The dimensions and configurations of the tape may be chosen based on any criteria. For example, the dimensions and configurations of the tape on the cells may be based on a desired electrical insulation, a desired thermal conductivity, a desired gravimetric energy density of the module, and/or a desired volume or density of the inter-cell filling material (e.g., the tape material(s) including the expandable foam), and/or a desired module weight. The dimensions and configurations of the tape adhered to the cells may take into consideration various properties of the tape, such as the expansion of the material(s) and/or thermal and/or electrical properties. In some embodiments, expandable foam of the tape may expand in only a height direction (e.g., a radial direction of the cells). In other embodiments, expandable foam of the tape may expand in multiple directions. The dimensions and configurations of the tape on the cells may be chosen based on dimensions of the expansion of the tape. For example, if the tape expands in every direction, then the tape may be placed further from headers of the cells than if the tape only expands in the height direction (e.g. a radial direction of the cells).

In some embodiments, the cells may be spaced within the module so that they have a millimeter void between their respective side surfaces (e.g., a millimeter space between cells 308 in a radial direction of the cells) and the tape includes an adhesive and a compressed foam. In various embodiments, the height of the adhesive is negligible compared to the compressed foam. Illustrative heights of the compressed foam include less than half a millimeter; for example, the height may be typically about an eighth of a millimeter, or typically about a sixth of a millimeter, or typically about a fourth of a millimeter, or typically about a third of a millimeter, or typically about a half of a millimeter. Upon expanding, the compressed foam may expand to typically at least about 125% of its compressed height (e.g., for a foam having a compressed height of 1 mm, it may expand to 2.25 mm), or to typically at least about 150% of its compressed height (e.g., a compressed height of 1 mm expanding to 2.5 mm), or to typically at least about 175% of its compressed height (e.g., a compressed height of 1 mm expanding to 2.75 mm), or more typically to at least about 200% of its compressed height (e.g., a compressed height of 1 mm expanding to 3 mm). Similarly, the compressed foam may expand to respective amounts of volume; to typically at least about 125% of its compressed volume, or to typically at least about 150% of its compressed volume, or to typically at least about 175% of its compressed volume, or to more typically at least about 200% of its compressed volume.

In some aspects, if there is a one millimeter radial distance between the cells in the housing and there is tape on each cell and at a same height on each cell so that the expanded tape may make contact at a middle area of the one millimeter void, it may be advantageous to choose a tape having a height that expands to a half of a millimeter so that the tape, when fully expanded, fills the millimeter void between the side surfaces of the cells (e.g., a tape having a compressed height of 0.25 of a millimeter and an expansion of 100% so that the expanded height is a half of a millimeter). In additional illustrative embodiments, if there is a one millimeter radial distance between the cells in the housing and there is tape on each cell and at a same height on each cell, it may be advantageous to choose a tape having a height that expands to more than what is necessary to fill the void between the side surfaces of the cells. For example, it is possible to use a tape having a compressed height of 0.25 of a millimeter and an expansion of 125% so that the expanded height is 0.5 of a millimeter (due to the limited available space between the cells for expanding) but then there is additional pressure provided by the expanded tape between the cells (due to the tape having an expansion of 125% but only being able to expand to 100% due to the limited available space) to provide more inter-cell rigidity in the battery module. Also, if there is a one millimeter radial distance between the cells in the housing and there is tape on each cell and at a same height on each cell, it may be advantageous to choose a tape having a compressed height of 0.2 of a millimeter that will expand to three times its height, so that the expanded height would be 0.6 of a millimeter.

Illustrative heights of the compressed tape include typically at least about 0.1 of a millimeter, typically at least about 0.15 of a millimeter, typically at least about 0.2 of a millimeter, typically at least about 0.25 of a millimeter, and typically at least about 0.3 of a millimeter. Further illustrative amounts of expansion of the tape include typically at least about 150%, typically at least about 175%, typically at least about 200%, typically at least about 225%, typically at least about 250%, typically at least about 275%, typically at least about 300%, typically at least about 325%, and typically at least about 350%.

Embodiments described herein may choose a dimension (including an expanded dimension) of the tape based on a desired gravimetric energy density of the module(s). In some embodiments, a height of the expanded tape (or amount of expansion) may be chosen based on a desired pressure or compression between the cells. For example, if there is a one millimeter radial distance between the cells in the housing and there is tape on each cell and at a same height on each cell, it may be advantageous to choose a tape having a compressed height of 0.2 of a millimeter that will expand to three times its height, so that when the expanded tape fills the one millimeter distance, there is pressure caused by the increased density due to the tape only having 0.5 of a millimeter to expand when the tape would otherwise expand to 0.6 of a millimeter. In this example, the additional compression provided between the cells may provide structural advantages that outweigh the decrease in gravimetric energy density caused by the use of tape having an expansion factor (e.g., of 200%) that is beyond what is needed to fill the distance between the cells. The density of the expanded tape ranges typically from about 0.05 to about 1.5 g/cm$^3$ and more typically from about 0.1 to about 0.5 g/cm$^3$.

Added mass adversely affects the gravimetric energy density of the battery system. It is generally advantageous to increase the gravimetric energy density of cells and battery modules (as this value directly translates to the gravimetric energy density of battery packs) by increasing the capacity of the cells and/or module in comparison to their weight to improve the performance of the battery (e.g., by improving the performance of the cells and/or module). Increases in gravimetric energy density have conventionally been difficult to achieve. Reasons for this include the fact that it can be difficult to decrease the weight of the battery module. As the battery is also one of the largest, heaviest, and most expensive single components of an electric vehicle, any reduction in size and/or weight can advantageously have significant cost savings. In certain aspects, it is important to consider the gravimetric energy density of the module when choosing an amount of tape to use in the present embodiments because limiting an amount of tape and/or adhesive may advantageously reduce weight of the module.

Also, choosing dimensions and/or configurations of the tape that allow it to expand to close to its full expansion to hold the cells in place without using extra amounts of tape can advantageously lower the density. Embodiments of the present disclosure can advantageously improve the gravimetric energy density of the module(s) by providing improved structural, electrical, and/or thermal properties while using less material(s) or less dense material(s) to achieve the improvements.

In various embodiments, the tape does not extend an entire height of the cell (e.g., the distance between the top surface and the bottom surface of the cell) so that the cell may be fit into a carrier that holds the cells within the module. Also, the tape after expansion may be located a certain distance from headers of the cells because such a space may provide a working area for making electrical interconnections, inserting other materials, and/or the like.

Referring now to FIGS. 3A-3D, these figures show various configurations of tape in a compressed form (e.g., prior to a full expansion) applied to cells 308. The tape shown in FIGS. 3A-3D is in a partially or fully compressed form so that it may expand beyond the size shown in FIGS. 3A-3D. FIGS. 3A-3D are not shown to scale; for example, the distance between the cells may be much smaller than what is shown in FIGS. 3A-3D.

Figure 3A:
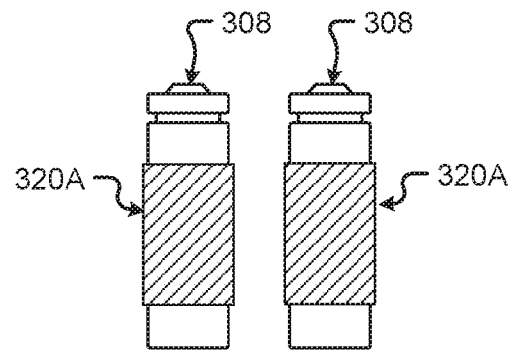
FIGS. 3A-3D show side views of battery cell structures in accordance with embodiments of the present disclosure.

FIG. 3A shows a detailed side view of adjacent battery cells 308 held, for example, in receptacles disposed in a structural support inside a battery module at a stage of assembly in accordance with embodiments of the present disclosure. In FIG. 3A, the battery cells 308 may be held in place adjacent to one another as shown. The cells 308 may be held in place, at least partially, via structural components such as a housing (e.g., housing 112; not shown). In some embodiments, a surface of each battery cell 308 (e.g., the bottom surface of the cells 308) may be placed into contact with a cooling plate (not shown). In certain aspects, the cells 308 with compressed tape 320A may be inserted into a volume at least partially enclosed by an attached lower housing 112A and cover 112B, and after the cells 308 with the adhered tape 320A have been disposed in the housing 112, the lower housing 212A and the cover 212B may be attached to one another. The tape 320A may expand or finish expanding within the attached lower housing 212A and cover 212B.

In FIG. 3A, the tape 320A is configured to be in contact with side surfaces of the cells 308. In the embodiments shown in FIG. 3A, the tape 320A is a single continuous piece applied on each cell 308, extending along a portion of the height of each cell 308 and entirely around a side surface of each cell 308. The tape 320A is positioned to leave a gap (e.g., a space on the side surface of the cell 308 that is devoid of tape) at an upper and lower portion of the cell 308 adjacent to the top surface and bottom surface of the cell 308.

As shown in FIG. 3A, the tape 320A may be applied symmetrically to the cells 308 when the tape 320A is in a compressed form. The tape 320A applied to the cells 308 may be a size and/or amount that takes into consideration the increased volume that occurs from its expansion. The tape 320A increases in volume when it expands, and the tape 320A may expand in any one or more directions. For example, the tape 320A may expand in only a radial direction of the cells 308 or the tape 320A may expand in all directions away from the adhesive. The tape 320A may comprise an adhesive and expandable foam that is initially in a compressed form (as shown in FIG. 3A) and then expands after application to the cells 308. One type of tape and/or adhesive may be used, or various combinations of tape(s) and adhesive(s) may be used.

Figure 3B:
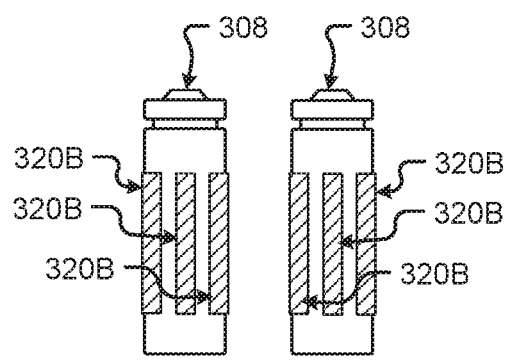

FIG. 3B shows a detailed side view of adjacent battery cells 308 held, for example, in receptacles disposed in a structural support inside a battery module at a stage of assembly in accordance with embodiments of the present disclosure. In FIG. 3B, the tape 320B is positioned in vertical strips on the battery cells 308. The tape 320B is positioned so that the vertical strips of the tape 320B leave a gap (e.g., a space on the side surface of the cell 308 that is devoid of tape) at an upper and lower portion of the cell 308 adjacent to the top surface and bottom surface of the cell 308. The configuration shown in FIG. 3B may be advantageous to lower the amount of tape 320B used (thereby improving the gravimetric energy density of the module) while maintaining a structure between the cells 308. For example, the tape 320B may expand so that the expanded tape of the vertical strips on the cell is in contact with the expanded tape of the adjacent vertical strips on a same cell, and the expanded tape on one cell is in contact with the expanded tape on each of the adjacent cells.

Figure 3C:
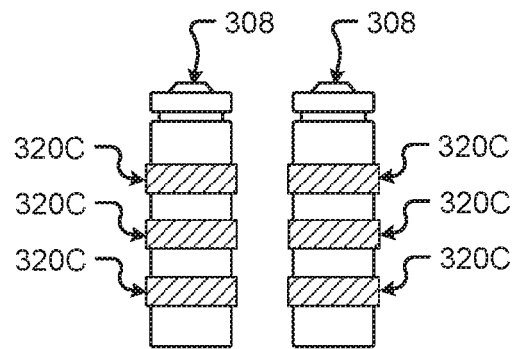

FIG. 3C shows a detailed side view of adjacent battery cells 308 held, for example, in receptacles disposed in a structural support inside a battery module at a stage of assembly in accordance with embodiments of the present disclosure. In FIG. 3C, the tape 320C is positioned in horizontal strips on the battery cells 308. The tape 320C is positioned so that the horizontal strips of the tape 320C leave a gap (e.g., a space on the side surface of the cell 308 that is devoid of tape) at an upper and lower portion of the cell 308 adjacent to the top surface and bottom surface of the cell 308. The configuration shown in FIG. 3C may be advantageous to lower the amount of tape 320C used (thereby improving the gravimetric energy density of the module) while maintaining a structure between the cells 308. For example, the tape 320C may expand so that the expanded tape of the horizontal strips on the cell is in contact with the expanded tape of the adjacent horizontal strips on a same cell, and the expanded tape on one cell is in contact with the expanded tape on each of the adjacent cells.

Figure 3D:
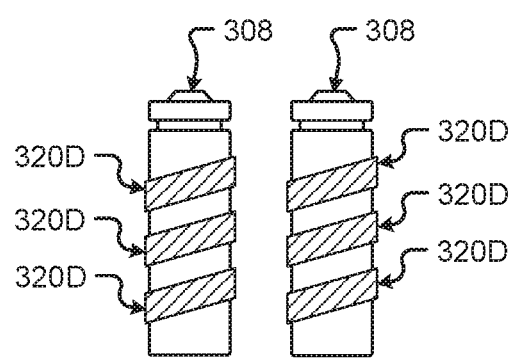

FIG. 3D shows a detailed side view of adjacent battery cells 308 held, for example, in receptacles disposed in a structural support inside a battery module at a stage of assembly in accordance with embodiments of the present disclosure. In FIG. 3D, the tape 320D is positioned in diagonal strips on the battery cells 308. The tape 320D is positioned so that the vertical strips of the tape 320D leave a gap (e.g., a space on the side surface of the cell 308 that is devoid of tape) at an upper and lower portion of the cell 308 adjacent to the top surface and bottom surface of the cell 308. The configuration shown in FIG. 3D may be advantageous to lower the amount of tape 320D used (thereby improving the gravimetric energy density of the module) while maintaining a structure between the cells 308. For example, the tape 320D may expand so that the expanded tape of the vertical strips on the cell is in contact with the expanded tape of the adjacent vertical strips on a same cell, and the expanded tape on one cell is in contact with the expanded tape on each of the adjacent cells.

Figure 4A:
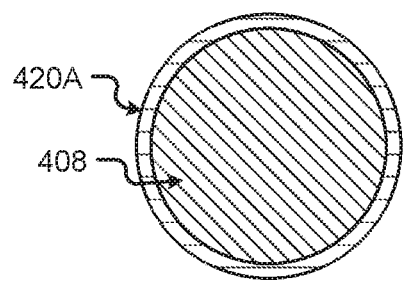
FIGS. 4A-4B show cross-sectional views of a first configuration of compressed and expanded battery cell structures in accordance with embodiments of the present disclosure.
Figure 4B:
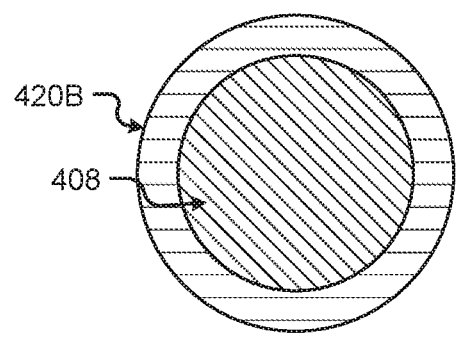

FIGS. 4A-4B show cross-sectional views of compressed and expanded battery cell structures in accordance with embodiments of the present disclosure. The configurations of FIGS. 4A and 4B may correspond, for example, to the embodiments shown in FIG. 3A or FIG. 3C. In FIG. 4A, the tape 420A is applied to a cell 408. In FIG. 4A, the compressed tape 420A may be adhered to the cell 408 at any point in the manufacturing process. For example, the compressed tape 420A may be adhered to the cell 408 prior to the cells (including cell 408) being arranged within a module. The compressed tape 420A on cell 408 expands to become the expanded tape 420B shown on the cell 408 in FIG. 4B. As discussed herein, the tape may expand due to any type of activation, and may be self-expanding (e.g., may expand over time). Thus, in illustrative embodiments, FIG. 4A may show compressed tape 420A soon after application to the cell 408, and FIG. 4B may show expanded tape 420B after an amount of time has passed after application to the cell 408.

Figure 5A:
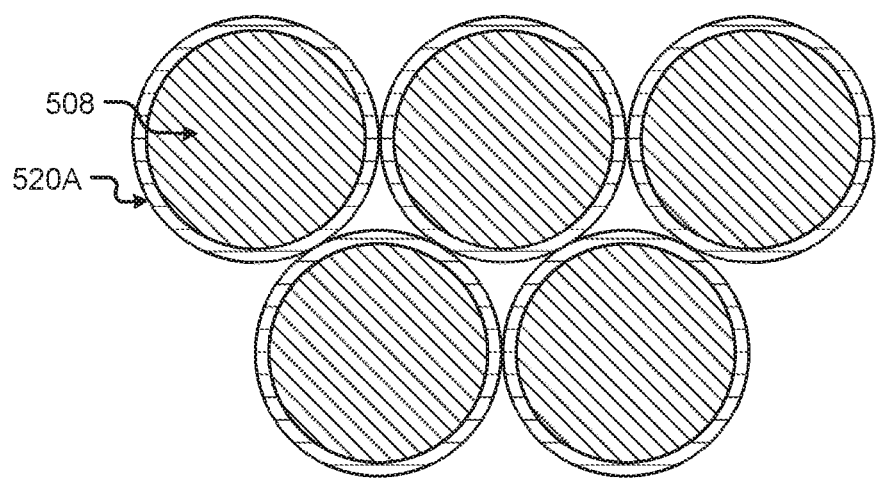
FIGS. 5A-5B show cross-sectional views of a second configuration of compressed and expanded battery cell structures in accordance with embodiments of the present disclosure.
Figure 5B:
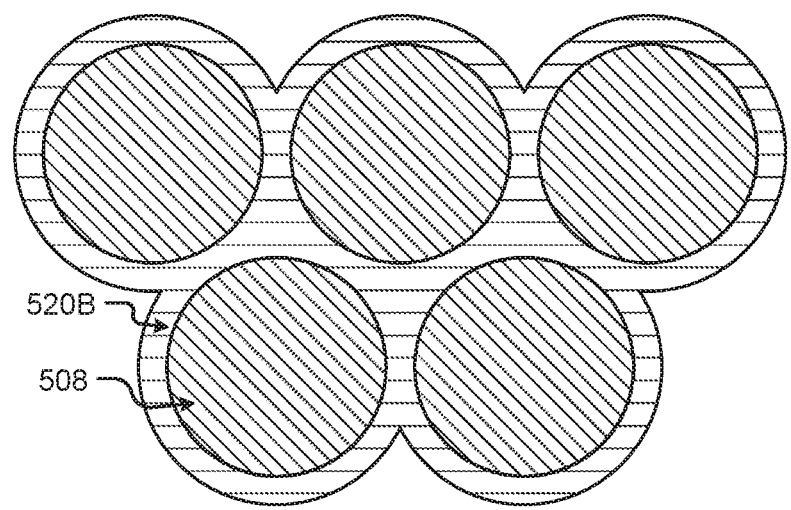

FIGS. 5A-5B show cross-sectional views of compressed and expanded battery cell structures in accordance with embodiments of the present disclosure. FIGS. 5A and 5B show configurations of cells 508 arranged together, for example, within a module (not shown). The configuration of FIGS. 5A and 5B may correspond, for example, to the embodiments shown in FIG. 3A or FIG. 3C. In FIG. 5A, the cells 508 are shown with compressed tape 520A applied. In various embodiments, although the tape 520A shown in FIG. 5A is touching between adjacent cells 508, such a configuration may not be desirable because the tape 520A may not provide sufficient structural support to the cells 508. Thus, it may be desirable that the tape expands to obtain the expanded tape 520B on the cells 508 shown in FIG. 5B. As shown in FIG. 5B, the tape may expand to occupy an entire distance between cells 508 in a radial direction of the cells 508, and may thereby provide advantageous structural, thermal, and/or electrical properties within the module.

Figure 6A:
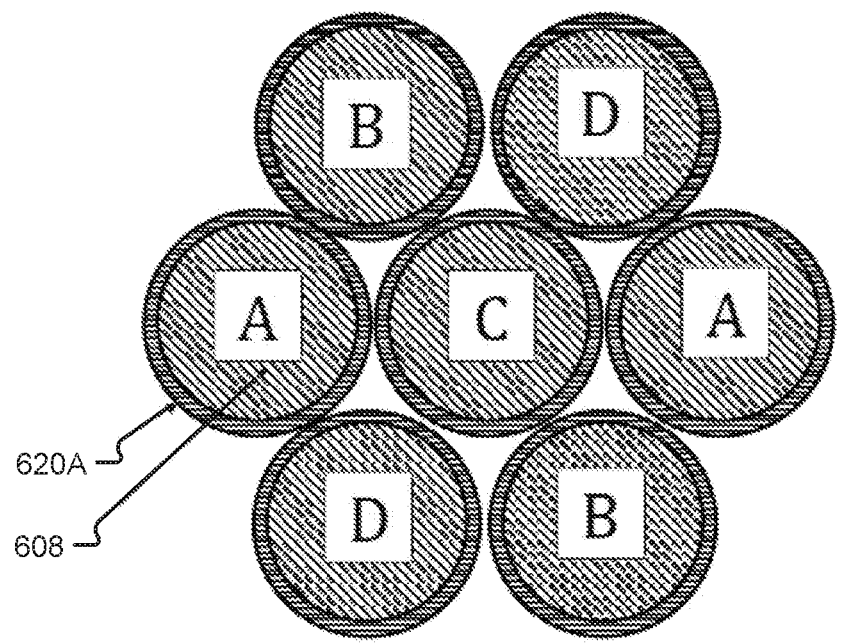
FIG. 6A shows a cross-sectional view of a third configuration of a compressed battery cell structure in accordance with embodiments of the present disclosure.

FIG. 6A shows a cross-sectional view of a third configuration of a compressed battery cell structure in accordance with embodiments of the present disclosure. In FIG. 6, tape 620A in a partially or fully compressed form is adhered to portions of side surfaces of cells 608, which include cells A-D arranged in the configuration as shown. The tape may extend fully around a circumference of each of the cells 608. The cells 608 in FIG. 6A are arranged in a hexagonal pattern. Each cell is located directly adjacent to six cells, however the cells across from each other can be taped at a similar position as they are never adjacent to each other due to being separated by a cell. With this pattern there are rows of cells where each row has two configurations, repeating. For example, as shown in FIG. 6A, the top row can have cells B-D-B-D-repeat and the next row has cells A-C-A-C-repeat with every other row being identical.

Figure 6B:
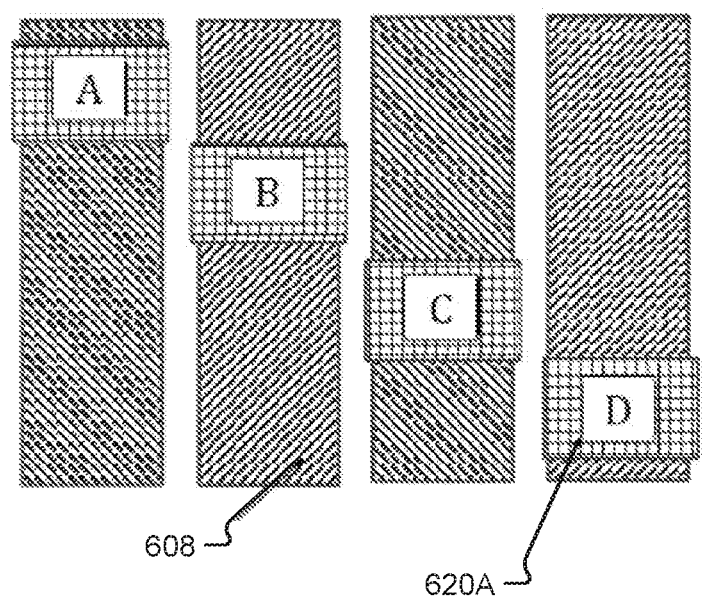
FIGS. 6B-6C show side views of the third configuration of battery cell structures in accordance with embodiments of the present disclosure.
Figure 6C:
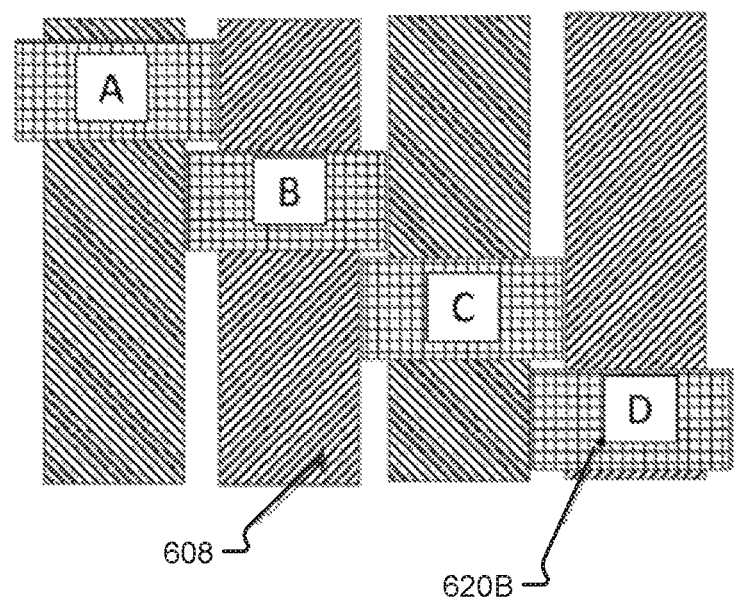

FIGS. 6B-6C show side views of the third configuration of battery cell structures in accordance with embodiments of the present disclosure. As shown in FIGS. 6A-6C, embodiments disclosed herein include using strips of tape around each cell such that the strips on adjacent cells do not overlap in a height direction of the cells. Such embodiments may advantageously decrease the amount of foam tape needed and/or allow the use of a thicker compressed tape.

As shown in FIG. 6B, the compressed tape 620A may be placed on each of the cells 608 in horizontal strips that do not overlap at heights of the cells 608 between adjacent cells. For example, cell A has the strip of horizontal tape 620A closest to its top surface. Cell B has the strip of horizontal tape 620A at an upper portion of the cell, but in a height location that is below (and not adjacent to) the tape 620A on cell A. Cell C has the strip of horizontal tape 620A at a lower portion of the cell, but in a height location that is below (and not adjacent to) the tape 620A on cell B. Cell D has the strip of horizontal tape 620A closest to its bottom surface, e.g., at a lower portion of the cell, but in a height location that is below (and not adjacent to) the tape 620A on cell C.

The compressed tape 620A of FIGS. 6A and 6B expands to become expanded tape 620B shown in FIG. 6C. In FIG. 6C, the tape has a same configuration of horizontal strips as is shown in FIG. 6B; however, the tape has been expanded (e.g., activated to expand from a compressed form). As shown in FIG. 6C, the expanded tape 620B extends a radial distance between cells 608 so that it is in contact with each of the adjacent cells. Thus, cell A has the expanded tape 620B from cell A and cell B in contact with portions of the side surface of cell A. Cell B has the expanded tape 620B from cell A, cell B, and cell C in contact with portions of the side surface of cell B. Cell C has the expanded tape 620B from cell B, cell C, and cell D in contact with portions of the side surface of cell C. Also, cell D has the expanded tape 620B from cell C and cell D in contact with portions of the side surface of cell D. As a person of ordinary skill in the art would understand and appreciate, although only four of the cells 608 are shown in FIGS. 6B and 6C, the cells 608 within a module may have additional contact with tape from adjacent cells when positioned in the module.

The configuration shown in FIGS. 6A-6C may be advantageous to lower the amount of tape used while maintaining a structure between the cells 608 and enable the use of thicker expandable tape. For example, advantageously, such a configuration may lower a density of the module, improve the gravimetric energy density of the module, and improve structural and/or thermal and/or electrical properties of the module, among other advantages. Further, the configuration shown in FIGS. 6A-6C may advantageously shorten the process for adhering the tape because less tape would need to be applied to each of the cells 608, which could also simplify the process, provide improved abilities to automate the process, and/or reduce costs. For example, it may be possible to use only about one fourth of the square footage of tape as shown in this third configuration, as compared to wrapping each individual cell. In addition, it may be advantageous to use a tape that expands enough to fill an entire radial distance between cells instead of attempting to have a piece of tape from each cell meet in the middle of the radial distance. Said another way, it may be advantageous to use strips of tape that fill in the space from one cell to another, not to another layer of tape.

The structure (e.g., the expandable tape) is not limited by the figures described herein and may be any shape and size and have any arrangement of cells. The arrangement of the cells may be in a honeycomb design/pattern or a matrix, for example. Also, the structure may be formed in any manner and at any timing. For example, the expandable material may be applied prior to the cells being placed in an arrangement (e.g., within a housing in an assembled, or connected, state), or the cells may be arranged (including partially arranged, e.g., arranged in a row) prior to applying any expandable material.

Various types of expandable material may be used, and the types of materials are not limited by this description. Depending on the type of material(s), the material(s) may provide various advantageous properties to the battery module; for example, the material(s) may act as a structural adhesive, thermal insulator, and/or a dielectric barrier within the battery module.

The thermal properties of the material(s) may advantageously control heat transfer in the module. For example, as cells are charged or fast charged, heat generated during the charging process can negatively affect the cells if the cells become too hot. To reduce the amount of heat generated during charging, continuous heat transfer between cells limiting cell temperatures within the module is desired, and thermal properties of the tape (including heat transfer and vapor permeability) may allow for heat transfer between cells. Also, in the event of damage to the cells, thermal runaway is possible. The thermal properties of the material(s) may advantageously reduce or prevent thermal runaway, for example by providing fire retardant properties. Further, properties of thermal insulation may be advantageous to prevent or reduce wide temperature variations within the cells.

In various embodiments, other materials may be incorporated with the expandable materials disclosed herein. Such other materials may be incorporated to provide additional benefits, such as improvements to structural, electrical, and/or thermal properties of the cells and module. Further, the expandable material may provide advantageous structural properties for the module. For example, when joined together, the cells and the tape may form a structural force distribution system allowing interconnected elements to move upon receiving a force or impact. In certain aspects, the structures for the cells as disclosed herein may provide an improved level of abuse tolerance to vehicular and other impacts.

Types of adhesive tape that may be used in embodiments of the present disclosure include self-adhesive tapes made by Nitto®. For example, a self-adhesive expandable tape by Nitto®, called 5880C, may be used. 5880C is a preformed, pressure sensitive, expandable elastomeric material that can adhere to many types of surfaces, such as various types of steel. 5880C may have a specific gravity of about 1.25 to about 1.35, a solids content of 99% minimum by weight, a hardness of about 8.5 mm-10.5 mm ASTM D-5 50 gF, and water absorption of about 5% maximum. Although the density of 5880C may be about 400 kg/m$^3$, the volume of the tape is advantageously adjustable based on the width of tape placed on each cell, with a smaller volume being able to counter a higher density. As will be appreciated, the tape has an adhesive backing layer that is attached to an expandable foam layer.

5880C is available in various sizes and is available as being tacky (e.g., adhesive) on one side of the tape or two sides of the tape). 5880C provides a heat activated expansion of about 100% to about 200% (e.g., about two to about three times its original volume). 5880C may have a structure of multiple layers, including one or more release liner layers with a heat activated expanding elastomer layer. In various embodiments, the heat activated expanding elastomer is a layer that is positioned between release liner layers. 5880C may have a shelf life of a minimum of 90 days at 35° C., which may advantageously allow for time during manufacturing of the modules as described herein without the tape expiring.

The environmental properties of 5880C may include the ability to withstand ten slams at −30° C. with no cracking or loss of adhesion, as well as no loss of adhesion, under-cutting corrosion or other detrimental effects under various environmental conditions. 5880C can have a flame resistance that includes being self-extinguishing for 50 passes with a two-inch flame, advantageously providing fire resistivity properties to the structures surrounding the cells in a module.

Nitto® also makes another self-adhesive expandable tape called 2535 that may be used in embodiments described herein. 2535 is a preformed, pressure sensitive, high expansion, elastomeric material that can adhere to many types of surfaces, such as various types of steel. 2535 may have a specific gravity of about 1.3, a solids content of about 97% minimum by weight, and water absorption of about 3% maximum.

2535 is available in various sizes and is available as being tacky (e.g., adhesive) on one side of the tape or two sides of the tape). 2535 provides a heat activated expansion of about 700% to about 900% (e.g., about eight to about ten times its original volume). 2535 may have a structure of multiple layers, including one or more release liner layers with a heat activated expanding elastomer layer. In various embodiments, the heat activated expanding elastomer is a layer that is positioned between release liner layers. 2535 may have a shelf life of a minimum of 90 days at 35° C. The environmental properties of 2535 may include the ability to withstand two 1.7 J impacts at −30° C. with no cracking or loss of adhesion, as well as no loss of adhesion, under-cutting corrosion or other detrimental effects under various environmental conditions.

Another type of expandable material that may be used in embodiments disclosed herein is a tape by Willseal®, named Willseal® 600. Willseal® 600 is a pre-compressed, self-expanding foam joint sealant that may form a highly flexible, weather-tight, seal. Willseal® 600 is advantageously not susceptible to breakdowns caused by excessive or rapid joint movements, thus protecting structures against water, wind, pressure changes, and dust. Willseal® 600 is waterproof to a wind driven rain at 12.5 psf (70 mph) yet it is vapor permeable. Willseal® 600 may include three elements; for example, a foundation of super-resilient micro-cell polyurethane foam, an impregnation of flame retardant, hydrophobic UV stabilized acrylic emulsion, and a pressure sensitive adhesive with embedded scrim to prevent stretching or pulling during installation.

Willseal® 600 is available from the manufacturer as pre-compressed on a roll or in sticks with the pressure-sensitive adhesive (PSA) on one side for ease of installation. Willseal® 600 is advantageously self-extinguishing and has a flame spread of zero with a smoke development rating of 5 per ASTM E 84. Thus, Willseal® 600 may advantageously provide fire-resistant properties to the structure of the module. Willseal® 600 has a thermal conductivity of about 0.28-0.30 Btu-in/hr-° F.-ft$^2$ per ASTM C 518, a thermal resistance of about 3.3 hr-3.6 hr-° F.-ft$^2$/Btu, and a temperature stability range of about −40° C./−40° F. to about 120° C./248° F. for short term and about −40° C./−40° F. to about 90° C./194° F. for long term. Willseal® 600 has an elongation of 120%+/−20% with a compression set of about 4.2%, maximum, per ASTM D 3574. The compatibility of Willseal® 600 with various materials include no signs of corrosion observed on zinc, steel, galvanized steel, aluminum and copper, as well as no adverse effects observed with PVC.

Willseal® 600 is self-expanding, and will self-expand in one direction depending on the storage and ambient temperature. The full expansion can take up to 48 hours or more, depending on temperature. Times for expansion may include: 5 or more hours at 37° F. (3° C.), 1 hour at 50° F. (10° C.), 10 minutes at 68° F. (20° C.), 5 minutes at 86° F. (30° C.), and one minute at 104° F. (40° C.).

The exemplary systems and methods of this disclosure have been described in relation to a battery module and a number of battery cells in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

The exemplary systems and methods of this disclosure have been described in relation to a battery module and a number of battery cells in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a battery module, comprising: a plurality of energy storage cells, each of the energy storage cells having side surface areas, wherein the plurality of energy storage cells are arranged in a pattern with each energy storage cell spaced apart a specified distance from one another; and an expandable material adhered, by an adhesive backing, to at least a portion of a side surface area of one or more of the energy storage cells, wherein the expandable material, in an expanded state, expands within the specified distance.

Aspects of the above battery module include wherein the expandable material has a compressed state and the expanded state, and wherein the expandable material is in contact with only every other cell in the plurality of energy storage cells when the expandable material is in the compressed state. Aspects of the above battery module include wherein each of the energy storage cells in the plurality of energy storage cells are in contact with the expandable material when the expandable material is in the expanded state. Aspects of the above battery module include wherein in the expanded state, the expandable material expands the specified distance. Aspects of the above battery module include wherein the expandable material is adhered to each of the energy storage cells in a same pattern on each of the energy storage cells. Aspects of the above battery module include wherein in the expanded state, the expandable material expands half the specified distance. Aspects of the above battery module include wherein the expandable material is adhered to a first set of the energy storage cells in a first pattern and to a second set of the energy storage cells in a second pattern, and wherein the first set of the energy storage cells are adjacent to the second set of the energy storage cells. Aspects of the above battery module include wherein the expandable material is adhered to a third set of the energy storage cells in a third pattern and to a fourth set of the energy storage cells in a fourth pattern, and wherein the third set of the energy storage cells are adjacent to the first set, the second set, and the fourth set of the energy storage cells. Aspects of the above battery module include wherein the specified distance is one millimeter, wherein the expandable material has a compressed height and an expanded height, and wherein the expanded height is between two to three times the compressed height. Aspects of the above battery module include wherein the specified distance is one millimeter, wherein the expandable material has a compressed height and an expanded height, wherein the expandable material is adhered to only every other cell in the plurality of energy storage cells at the compressed height, wherein the expanded height is about three times the compressed height, and wherein the compressed height is greater than one third of a millimeter.

Embodiments include an energy storage device, comprising: a plurality of energy storage cells, each of the energy storage cells having a side surface area, wherein the plurality of energy storage cells are arranged in a pattern with each energy storage cell spaced apart a specified distance from one another; and an expandable material adhered, by an adhesive layer, to at least some of the side surface areas, wherein the expandable material, when expanded, expands within the specified distance.

Aspects of the above energy storage device include wherein the expandable material has a compressed state and an expanded state, and wherein the expandable material is in contact with only every other cell in the plurality of energy storage cells when the expandable material is in the compressed state. Aspects of the above energy storage device include wherein each of the energy storage cells in the plurality of energy storage cells are in contact with the expandable material when the expandable material is in the expanded state. Aspects of the above energy storage device include wherein in the expanded state, the expandable material expands the specified distance. Aspects of the above energy storage device include wherein the expandable material is adhered to each of the energy storage cells in a same pattern on each of the energy storage cells. Aspects of the above energy storage device include wherein in the expanded state, the expandable material expands half the specified distance. Aspects of the above energy storage device include wherein the expandable material is adhered to a first set of the energy storage cells in a first pattern and to a second set of the energy storage cells in a second pattern, and wherein the first set of the energy storage cells are adjacent to the second set of the energy storage cells. Aspects of the above energy storage device include wherein the expandable material is adhered to a third set of the energy storage cells in a third pattern and to a fourth set of the energy storage cells in a fourth pattern, and wherein the third set of the energy storage cells are adjacent to the first set, the second set, and the fourth set of the energy storage cells. Aspects of the above energy storage device include wherein the specified distance is one millimeter, wherein the expandable material has a compressed height and an expanded height, and wherein the expanded height is between two to three times the compressed height.

Embodiments include a battery for an electric vehicle, comprising: a plurality of battery modules electrically interconnected with one another, wherein each battery module of the plurality of battery modules comprises: a plurality of energy storage cells, each of the energy storage cells having a side surface area, wherein the plurality of energy storage cells are arranged in a pattern with each energy storage cell spaced apart a specified distance from one another; and an expandable material adhered, by an adhesive layer, to at least a portion of the side surface areas, wherein the expandable material, in an expanded state, expands within the specified distance.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The term "structure" as used herein may be any type of material that functions to position the cells or is in contact with the cells. The structure can include one or more expandable materials and one or more adhesive materials, among others. The structure may be comprised of tape.

The term "tape" as used herein may be any type of material that is able to be adhered to a surface, including expandable materials. The tape may include any type of adhesive, and/or adhesive backing, and can include pressure-sensitive tape (which may be a self-stick tape comprising a pressure-sensitive adhesive coating onto a backing material (e.g., an expandable foam) that is sticky and adheres with pressure), water activated tape (which becomes sticky when moistened), and heat sensitive tape (which can be tack-free until activated by a heat source). Although the adhesive-backed foam may be described as "tape" herein, this description does not limit the types of tape, the types of adhesive, or the types of foam that may be used in the present disclosure.

The term "foam" as used herein refers to an expandable material. The foam may have pockets of gas in a liquid or a solid and the foam expands when the pockets are filled with the gas. The foam may have various thermal, electrical, and structural properties, and the properties are not limited by the described herein.

The term "adhesive" refers to any substance applied to one surface, or both surfaces, of two separate items that binds them together and resists their separation. The adhesive may be non-reactive (e.g., drying, pressure sensitive, contact, or hot) or reactive (e.g., multi-part, pre-mixed, frozen, or one-part) and may be natural or synthetic. It can rely on one or more mechanisms of adhesion, such as a mechanical mechanism and/or chemical mechanism. The surface(s) to be bonded may be activated prior to adhesive application by any surface activation technique, such as plasma activation, flame treatment, and wet chemistry priming.

The term "chemical properties" refer to one or more of chemical composition, oxidation, flammability, heat of combustion, enthalpy of formation, and chemical stability under specific conditions.

The term "thermal properties" refer to one or more of thermal conductivity, thermal diffusivity, specific heat, thermal expansion coefficient, and creep resistance.

The terms "determine," "calculate," "compute," and variations thereof, as used herein, are used interchangeably and include any type of methodology, process, mathematical operation or technique.

What is claimed is:

1. A battery module, comprising:
   a plurality of energy storage cells, each of the plurality of energy storage cells having side surface areas, wherein the plurality of energy storage cells are arranged in a pattern with each energy storage cell in the plurality of energy storage cells being spaced apart a specified distance from one another; and
   an expandable material adhered, by an adhesive backing, to at least a portion of a side surface area of one or more of the energy storage cells in the plurality of energy storage cells,
   wherein the expandable material, in an expanded state, expands within the specified distance, and
   wherein the expandable material is adhered to only every other cell in the plurality of energy storage cells, and wherein the expandable material has a fully expanded height that is at least 125% of the specified distance.

2. The battery module of claim 1, wherein the specified distance is about one millimeter.

3. The battery module of claim 1, wherein the expandable material is adhered to the only every other cell in the plurality of energy storage cells in a same pattern.

4. An energy storage device, comprising:
   a plurality of energy storage cells, each of the plurality of energy storage cells having a side surface area, wherein the plurality of energy storage cells are arranged in a pattern with each energy storage cell in the plurality of energy storage cells being spaced apart a specified distance from one another; and
   an expandable material adhered, by an adhesive layer, to at least some of the side surface areas,
   wherein the expandable material, when expanded, expands within and at least part of the specified distance, and
   wherein, in a fully expanded state, the expandable material has a fully expanded height of at least 125% of a compressed height, wherein the compressed height is equal to or less than the specified distance, and wherein the fully expanded height is greater than the specified distance.

5. The energy storage device of claim 4, wherein the expandable material is adhered to a first set of the energy storage cells in a first pattern and to a second set of the energy storage cells in a second pattern, and wherein the first set of the energy storage cells are adjacent to the second set of the energy storage cells.

6. The energy storage device of claim 4, wherein the expandable material is adhered to a first set of the energy storage cells in a first pattern and to a second set of the energy storage cells in a second pattern, and wherein the first set of the energy storage cells are adjacent to the second set of the energy storage cells, wherein the expandable material is adhered to a third set of the energy storage cells in a third pattern and to a fourth set of the energy storage cells in a fourth pattern, and wherein the third set of the energy storage cells are adjacent to the first set, the second set, and the fourth set of the energy storage cells.

7. A battery for an electric vehicle, comprising:
   a plurality of battery modules electrically interconnected with one another, wherein each battery module of the plurality of battery modules comprises:
   a plurality of energy storage cells, each of the plurality of energy storage cells having a side surface area, wherein the plurality of energy storage cells are arranged in a pattern with each energy storage cell of the plurality of energy storage cells being spaced apart a specified distance from one another; and
   an expandable material adhered, by an adhesive layer, to at least a portion of the side surface areas,
   wherein the expandable material, in an expanded state, expands within and at least part of the specified distance, and wherein the expandable material has a fully expanded state that is at least 125% of a compressed state of the expandable material, and wherein, when the expandable material is in the expanded state, it is less than 125% of the compressed state and substantially occupies the specified distance.

\* \* \* \* \*